US010374691B2

(12) United States Patent
Franchi et al.

(10) Patent No.: US 10,374,691 B2
(45) Date of Patent: Aug. 6, 2019

(54) MOBILE COMMUNICATION SYSTEM

(71) Applicant: Inmarsat Global Limited, London (GB)

(72) Inventors: Antonio Franchi, London (GB); Ammar Khan, London (GB)

(73) Assignee: Inmarsat Global Limited, London (GB)

( * ) Notice: Subject to any disclaimer, the term of this patent is extended or adjusted under 35 U.S.C. 154(b) by 0 days.

(21) Appl. No.: 15/510,563

(22) PCT Filed: Sep. 14, 2015

(86) PCT No.: PCT/GB2015/052650
§ 371 (c)(1),
(2) Date: Mar. 10, 2017

(87) PCT Pub. No.: WO2016/038394
PCT Pub. Date: Mar. 17, 2016

(65) Prior Publication Data
US 2017/0250750 A1    Aug. 31, 2017

(30) Foreign Application Priority Data

Sep. 12, 2014   (GB) .................................. 1416145.9

(51) Int. Cl.
*H04W 4/00*    (2018.01)
*H04B 7/185*   (2006.01)
(Continued)

(52) U.S. Cl.
CPC ..... *H04B 7/18506* (2013.01); *H04B 7/18508* (2013.01); *H04B 7/18563* (2013.01); *H04L 67/12* (2013.01); *H04W 4/046* (2013.01)

(58) Field of Classification Search
USPC .......................... 455/431, 3.01, 452.1, 435.1
See application file for complete search history.

(56) References Cited

U.S. PATENT DOCUMENTS 6,233,463 B1   5/2001   Wiedeman et al.
7,107,062 B2   9/2006   Cruz et al.
(Continued)

FOREIGN PATENT DOCUMENTS

EP    0 955 737 A2   10/1999
EP    2 779 480 A2   9/2014
(Continued)

OTHER PUBLICATIONS

Federal Institute of Industrial Property Search Report directed to related International Patent Application No. PCT/GB2015/052650, dated Feb. 26, 2019.

*Primary Examiner* — David Q Nguyen
(74) *Attorney, Agent, or Firm* — Sterne, Kessler, Goldstein & Fox P.L.L.C.

(57) ABSTRACT

A mobile communication system comprises: a mobile platform (1) having a plurality of interfaces (2) to a respective plurality of mobile communication networks (6), and a router (5) for selectively connecting one or more communications devices (4) within the mobile platform (1) to one or more of the interfaces (2), for communication over the respective mobile communication networks (6); and a central core (10), common to each of the mobile communication networks (6), including a resource manager (11) arranged to allocate communication resources to the link interfaces (2); wherein the resource manager (11) is responsive to resource requests (S3) from the mobile platform (1) and to network conditions in the mobile communication networks (6).

16 Claims, 3 Drawing Sheets

(51) Int. Cl.
*H04L 29/08* (2006.01)
*H04W 4/04* (2009.01)

(56) References Cited

U.S. PATENT DOCUMENTS

| | | |
|---|---|---|
| 7,142,854 B1 | 11/2006 | Kauffman et al. |
| 7,558,569 B2 | 7/2009 | Chang et al. |
| 7,715,838 B2 | 5/2010 | Swensen et al. |
| 8,462,799 B2 | 6/2013 | Molsberry et al. |
| 8,606,266 B1 | 12/2013 | Mitchell |
| 9,313,773 B2 | 4/2016 | DuBois et al. |
| 2003/0045289 A1* | 3/2003 | Zhao ............... H04B 7/18539 455/435.1 |
| 2003/0050072 A1* | 3/2003 | Noerpel ........... H04B 7/18539 455/452.1 |
| 2004/0192188 A1* | 9/2004 | Dieudonne ........... H04W 24/00 455/3.01 |
| 2004/0198346 A1 | 10/2004 | Swensen et al. |
| 2004/0253951 A1* | 12/2004 | Chang ............... H04B 7/18506 455/431 |
| 2006/0030311 A1* | 2/2006 | Cruz ..................... H01Q 1/246 455/431 |
| 2006/0252422 A1* | 11/2006 | Kauffman .......... B64D 45/0015 455/431 |
| 2008/0144617 A1 | 6/2008 | Molsberry et al. |
| 2011/0182259 A1 | 7/2011 | Perkins et al. |
| 2014/0136658 A1 | 5/2014 | Wahler |

FOREIGN PATENT DOCUMENTS

| | | |
|---|---|---|
| RU | 2516686 | 3/2014 |
| WO | WO 2004/028034 A1 | 4/2004 |
| WO | WO 2014/078249 A1 | 5/2014 |

* cited by examiner

MOBILE COMMUNICATION SYSTEM

FIELD OF THE INVENTION

This invention relates to a mobile communication system in which a mobile platform is able to support multiple discrete communications links over different networks and/or frequency bands, such as satellite and terrestrial networks, and/or different satellite networks operating over different bands. Aspects of the invention include a terminal, satellite access station, terrestrial base or ground station, network control and other apparatus for use in such a system.

BACKGROUND

Combined satellite and terrestrial communication systems, such as Complementary Ground Component (CGC) or Ancillary Terrestrial Component (ATC) systems, are known in the art. Such systems provide integrated satellite and terrestrial links to mobile platforms. An example of such a system is disclosed in U.S. Pat. No. 6,233,463.

Multi-band or hybrid satellite systems are also known, in which links are provided to a mobile platform over different satellite systems operating in different frequency bands. An example of such a hybrid system is disclosed in WO 2004/28034 A1.

U.S. Pat. No. 8,606,266 discloses a data transmission system in which an airborne user terminal is able to communicate over either a first or a second data network, the second data network having more contiguous physical coverage than the first network. A proxy unit on the aircraft is configured to select routing via the first or second network based on a user condition, such as user preference, type of user session or travel path of the user.

STATEMENT OF THE INVENTION

According to one aspect of the present invention, there is provided a mobile communication system, comprising: a mobile platform having a plurality of interfaces to a respective plurality of mobile communication networks, and a router for selectively connecting one or more communications devices within the mobile platform to one or more of the interfaces, for communication over the respective mobile communication networks; and a central core common to each of the mobile communication networks, comprising a policy master arranged to determine resource requirements within the mobile communication networks in accordance with one or more defined policies and a resource manager arranged to allocate resources to the mobile communication networks in response to resource requests from the router and to resource requests from the policy master.

The resource manager may control which of the link interfaces are active at any one time and/or may vary the communication resources available through each of the link interfaces. The allocation of communication resources may be varied dynamically. The resource manager may apply one or more predetermined rules or heuristics based on a number of conditions, including but not limited to the nature of the resource requests, the conditions or available capacity within the mobile communication networks, the current or future position of the mobile platform, or cost, energy, latency or efficiency requirements.

The resource manager may be located within a Network Operations Centre (NOC). The resource manager may be responsive to network metrics and parameters, for example provided by Network Management Station (NMS).

The router may select different interfaces for uplink and downlink communications. The router may select more than one of the interfaces for simultaneous communications.

The mobile platform may comprise an aeronautical platform or a maritime platform, for example. The mobile platform may include a local network for connecting a plurality of on-board devices to the router. The local network may be a wired and/or wireless network.

Aspects of the invention include the mobile platform, the router and the resource manager.

Aspects of the present invention are defined with reference to the accompanying claims.

BRIEF DESCRIPTION OF THE DRAWINGS

Embodiments of the invention will now be described, by way of example only, with reference to the accompanying drawings in which.

DESCRIPTION OF EMBODIMENTS

Figure 1:
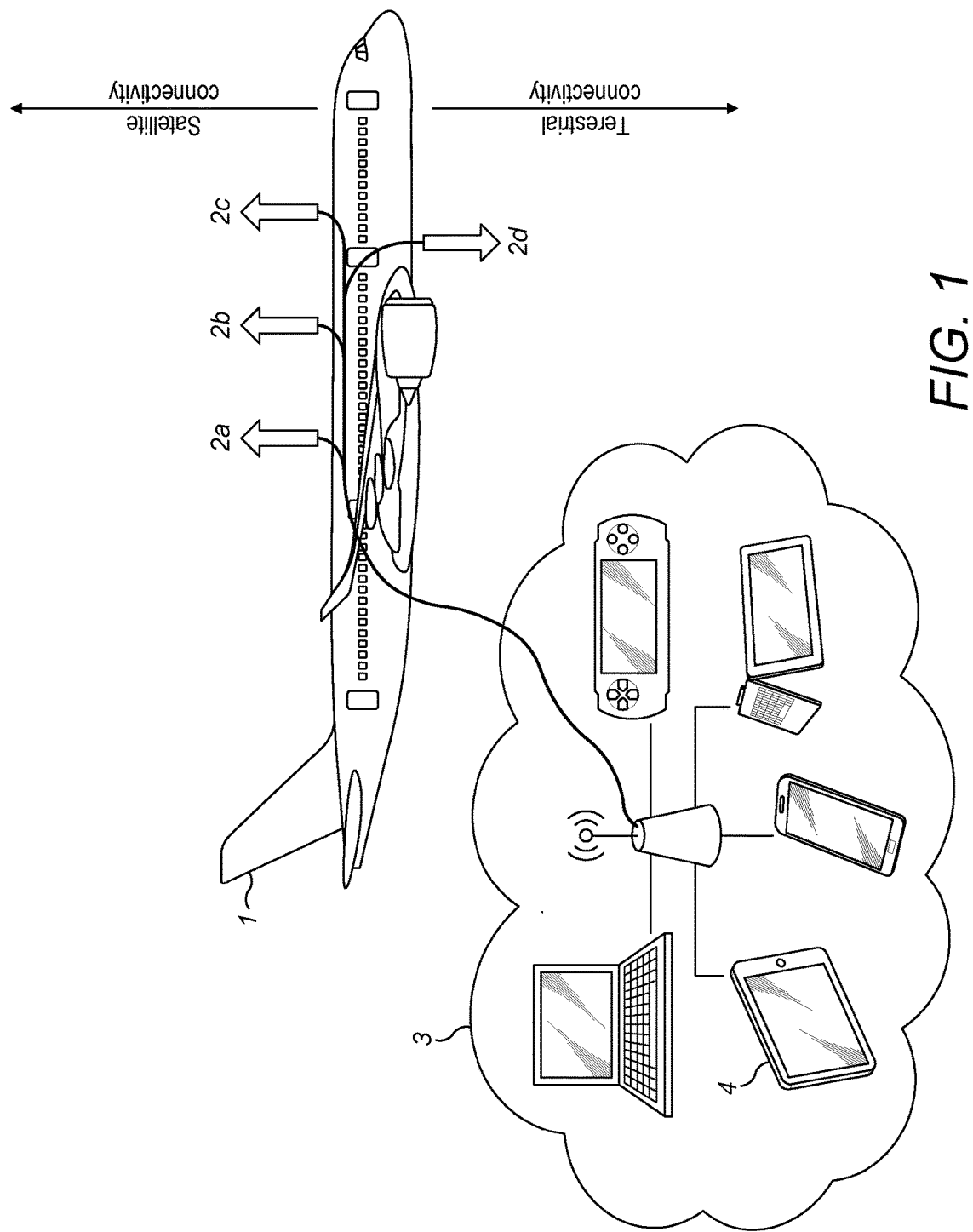
FIG. 1 is a schematic diagram of the on-board elements of a communication system according to an embodiment of the present invention.

FIG. 1 illustrates a system in which a plurality of radio interfaces 2 are installed on an aircraft 1, including satellite interfaces 2a, 2b, 2c to one or more satellite communications networks, such as:

- a high-speed data communications network such as the Inmarsat® Global Xpress® (GX) network which uses Ka-band spectrum for communication with the Inmarsat-5 satellite(s).
- an 'always-on' data network such as the Inmarsat® Swift Broadband® (SBB) network, which provides an IP-based packet switched global service based on the BGAN service, using L-band spectrum for communication with the Inmarsat-4 satellites.
- the satellite component of a hybrid satellite/terrestrial network, such as the proposed Inmarsat S-band satellite network (S-Comm), which will provide communication with one or more satellites using the S-band spectrum.

The interfaces 2 may include one or more interfaces 2d to terrestrial communication networks, for example the terrestrial component of a hybrid satellite/terrestrial network such as the Inmarsat Aviation Complementary Ground Component (ACGC) of the proposed Inmarsat S-band service. Preferably, some or all of the satellite and/or terrestrial interfaces 2 are bidirectional.

The above interfaces 2 are connected to on-board equipment (OBE) within the aircraft 1, for example to an Aircraft Cabin Network (ACN) 3 for providing connectivity to various client devices 4, which may include personal devices belonging to the passengers or crew, and cockpit and/or cabin communication or In-flight Entertainment (IFE) systems. The ACN 3 may comprise wireless and/or wired LANs.

In the system according to this embodiment, one or more of the interfaces 2 may be configured or combined to provide connectivity to the client devices 4 in the most efficient and cost-effective manner, for example so to provide an optimum Quality of Experience/Service (QoE/QoS), taking account of any cost constraints, using capacity in one or more of the corresponding networks. Different interfaces 2 may be used respectively for the uplink (i.e. from the aircraft) and downlink (i.e. to the aircraft) for the same communication session and/or device 4, or for the communications traffic to/from the ACN 3 as a whole.

Examples of such configurations and combinations are shown in Table 1 below:

TABLE 1

Communication Link Examples

| Downlink | Uplink | Example applications |
|---|---|---|
| GX | GX | Only GX service available for instance due to either 1) lack of coverage of other systems 2) service specific request, 3) no other interface provided |
| ACGC | ACGC | Specifically attractive when aircraft 1 is over land with ACGC presence and very high throughputs and low latency are driving requirements |
| SBB | SBB | Services requiring low bandwidth but high availability, such as weather chart updates for cockpit, other non-safety services, low bandwidth cabin services |
| S-Comm | S-Comm | A-DSL like services well suited for S-comm system Multi-route where downlink is via high capacity Ka-band system and return link is via L-band SBB. |
| GX | SBB | |
| S-comm | ACGC | S-comm provides the downlink whereas ACGC used for return link |
| S-comm | SBB | Satellite only L/S band solution |
| ACGC/S-comm | ACGC/S-comm | Combination of two links utilised for maximizing QoS and minimising cost |
| ACGC/S-comm | ACGC | Multiple links on the downlink and single link on the uplink |
| GX/ACGC/S-comm/SBB | GX/ACGC/S-comm/SBB | All links used for delivery service |

As shown in Table 1 above, more than one interface 2 may be active simultaneously, giving aggregate multi-network connectivity to the ACN 3 and/or to individual devices 4. The multi-network connectivity is managed by a management system that is preferably distributed between the aircraft 1 and the external network, as shown for example in FIG. 2.

Figure 2:
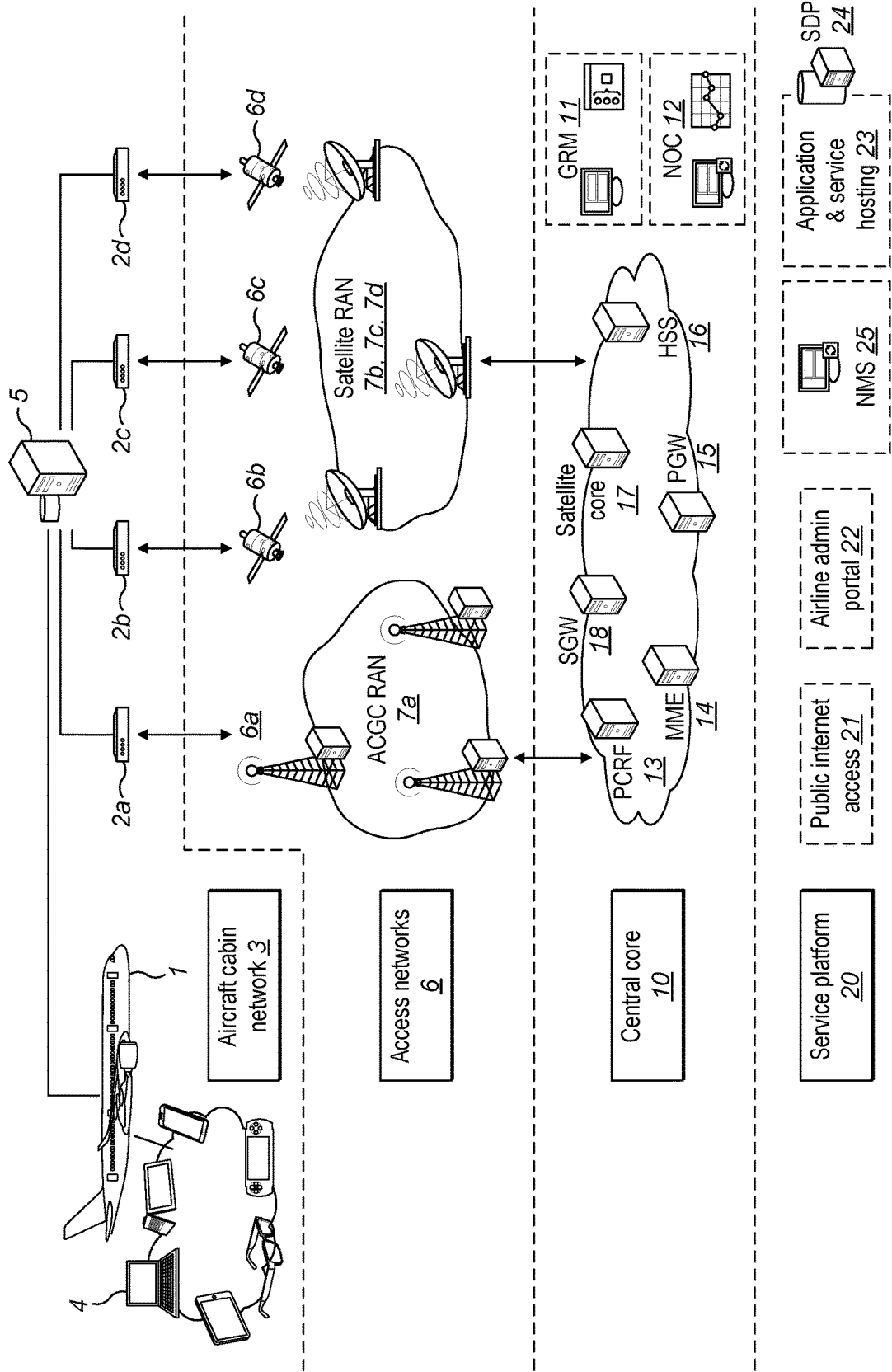
FIG. 2 is a network diagram of the communication system in the embodiment.

FIG. 2 shows the overall network architecture of the system. The interfaces 2a, 2b, 2c, 2d are connected to respective networks 6a to 6d, each having an associated Radio Access Node (RAN) 7a, 7b, 7c, 7d. Each of the networks 6 is connected to a common central core 10, containing a Global Resource Manager (GRM) 11 and a Network Operations Centre (NOC) 12, as well as other network elements such as Policy and Charging Rules Function (PCRF) 13, Mobility Management Entity (MME) 14, Serving Gateway (SGW) 18, Packet Gateway (PGW) 15, Home Subscriber Server (HSS) 16 and Satellite Core 17. The common central core 10 interfaces with service platform(s) 20, such as public Internet access 21, airline administrative portal 22, and application and service hosting 23 including service delivery platform (SDP) 24. The common central core also interfaces with a network management system (NMS) station 25.

The multi-network connectivity is preferably managed by a policy master located within the common core 10 and a policy slave located on board the aircraft 1. The policy master may reside at the NOC 12, and the policy slave may be a service-aware router (SAR) 5 connected to, or forming part of the ACN 3.

The policy master implements heuristics or rules to request assignment of resources with the aim of providing optimum QoE. The policy slave is able to drive at least some of the policy decision rules and to request capacity for its connected devices 4. The policies governing the assignment of resources may include one or more of:

Service type requested

Requested committed information rate (CIR) and maximum information rate (MIR)

Guaranteed access policy

Radio link availability for the onboard radio link interfaces

Utilisations/loading of available links/networks

Latencies of available links/networks

Least cost route (e.g. in terms of number of hops and/or cost per unit of data)

Radio link qualities

Position of the aircraft 1, determined for example by satellite navigation systems such as GPS and/or GLONASS Time of the day Route of the flight Special events in time and geography (e.g. disruptions)

Energy efficiency requirements

Communication reliability requirements

Number of passengers/devices with active session onboard

The NMS 25 collects statistics relevant to QoE/QoS, radio link utilisation, availability, quality and other parameters and provides useful metrics and feedback to the NOC 12. The NOC 12 uses this feedback to adjust/optimise Radio Resource Management (RRM) dynamically, for example in real-time. The NOC 12 then requests the Global Resource Manager (GRM) 11 to assign capacity to the various networks 6 so as to provide resources to the various interfaces 2 on board the aircraft 1, via the corresponding RAN 7. The NOC 12 and GRM 11 work together to allocate capacity on demand to the networks 6 to serve the real time demand, making use of the information provided by the NMS 25. Note that the capacity allocated to the RAN 7 may be a proportion of the available spectrum and need not correspond to specific channels. The RAN 7 may in turn allocate specific channels to the interfaces 2 utilizing the available spectrum.

The policy master, being located within the common central core 10, is optimally positioned to determine an overall allocation policy across the different networks 6. The policy slave, being connected locally to the ACN 3 and the interfaces 2, is optimally positioned to respond to local demand from the devices 4 and local conditions pertaining to the aircraft 1.

In alternative embodiments, the decision-making function may be shifted towards the SAR 5. For example, the NOC 12 may report network conditions to the SAR 5, which may then request capacity for the interfaces 2 based in part on the network conditions. However, it is more efficient to centralise decision-making relating to network conditions at the central core 10, for example at the NOC 12.

Conversely, the decision-making function may be shifted towards the central core 10/NOC 12. For example, the SAR 5 may report demand and other conditions, and all capacity and link allocations may be made by the central core 10/NOC 12.

Figure 3:
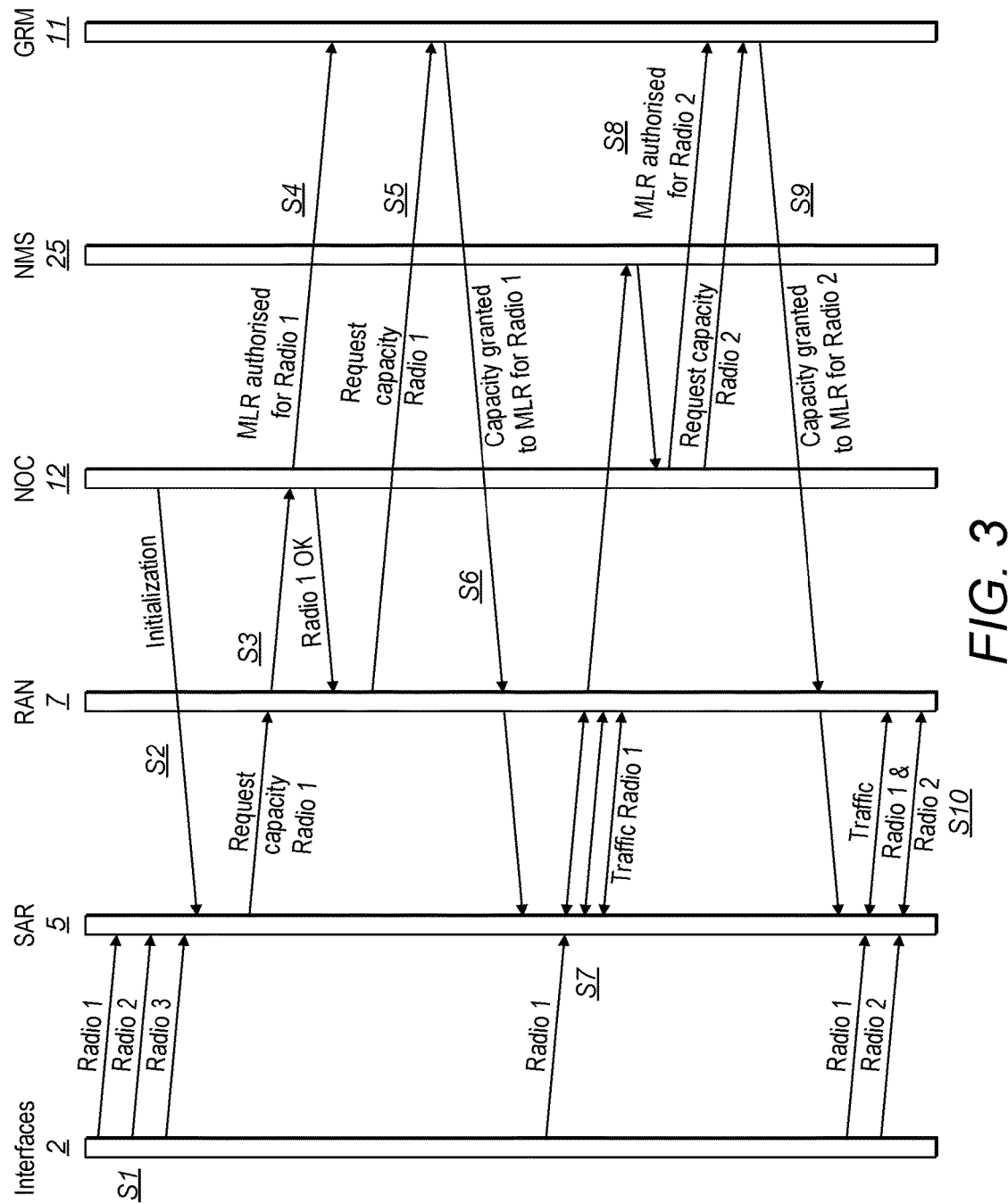
FIG. 3 is a ladder diagram illustrating examples of the operation of the system of the embodiment.

Examples of the operation of the system are shown in the ladder diagram of FIG. 3, illustrating the basic nominal interactions between the network nodes and the OBE in order to provide optimum connectivity on board the aircraft 1. The diagram shows two examples sequentially: an OBE-initiated capacity request, and a network-initiated capacity assignment.

In the OBE-initiated capacity request, at step S1 the interfaces 2 declare their availability to the SAR 5. At step S2, the NOC 12 initialises the interfaces 2 with the required provisioning and authorisations. At step S3, the SAR 5 responds to traffic demand (e.g. from the devices 4) by sending a request via the RAN 7 to the NOC 12 to use one or more of the interfaces 2. At step S4 the NOC 12 authorises the use of the requested interface(s) 2 and informs the GRM 11, the NMS 25 and the RAN associated with the requested communications networks 6. At step S5, the RAN requests capacity for the requested interfaces 2 from the GRM 11. At Step S6, the GRM 11 assigns capacity to the SAR 5 for the requested links, via the RAN, informing NMS 25. At step S7, communications traffic is exchanged using the assigned capacity, monitored by the NMS 25.

In the network-initiated capacity assignment, at step S7 the policy master at the NOC 12, informed by the NMS 25, detects a change in the capacity required for communication with the OBE. Based on global availability and demand for capacity, at step S8 the policy master then authorises a variation in the network links and/or capacity used by the OBE and requests a variation in capacity over the relevant links from the GRM 11. At step S9 the GRM 11 grants the requested capacity to the RAN 7, informing the NMS 25. At step S10, the SAR 5 performs load balancing between the plurality of interfaces 2 now available to the OBE, allowing simultaneous bidirectional communications over each of the available interfaces 2.

The above embodiment is described with reference to an aeronautical mobile platform, but is also applicable to other types of mobile platforms, such as a maritime platform on a ship. The maritime platform may equally utilize a plurality of radio interfaces including satellite and terrestrial links and operate in similar fashion as the aircraft in FIG. 1 over a plurality of mobile communications networks in similar fashion as FIG. 2, whereby examples of operation are shown in FIG. 3.

Many alternative embodiments may be envisaged, which nevertheless fall within the scope of the invention as defined by the claims. It is understood that protection is sought hereby for any and all novel subject matter and combinations thereof disclosed herein. Unless the contrary is stated, features of each embodiment may be combined with features of any other.

The invention claimed is:

1. A mobile communication system, comprising:
a mobile platform having a plurality of interfaces to a respective plurality of mobile communication networks, and a router for selectively connecting one or more communications devices within the mobile platform to one or more of the interfaces, for communication over the respective mobile communication networks; and
a central core common to each of the mobile communication networks, comprising a policy master arranged to determine resource requirements within the mobile communication networks in accordance with one or more defined policies and a resource manager arranged to allocate resources to the mobile communication networks in response to resource requests from the router and to resource requests from the policy master,
wherein the resource manager is arranged to control which of the interfaces are active on the mobile platform such that they are connected to a respective one of the mobile communication networks, thereby controlling the respective mobile communication network's connectivity to the router.

2. The system of claim 1, wherein the resource manager is arranged to vary the communication resources available through one or more of the interfaces.

3. The system of claim 1, wherein the resource manager is arranged to vary the allocation of communication resources dynamically.

4. The system of claim 1, wherein the defined policies comprise one or more rules or heuristics based on one or more of: the nature of the resource requests, the conditions or available capacity within the mobile communication networks, the current or future position of the mobile platform, and cost, energy, latency or efficiency requirements.

5. The system of claim 1, wherein the policy master is responsive to network metrics and/or parameters of the mobile communications networks.

6. The system of claim 5, wherein the network metrics and/or parameters are collected and provided by a Network Management System Station.

7. The system of claim 1, wherein the router is able to select different ones of the interfaces for uplink and downlink communications.

8. The system of claim 1, wherein the router is able to select more than one of the interfaces for simultaneous communications.

9. The system of claim 1, wherein the mobile platform includes a local network for connecting a plurality of communication devices to the router.

10. The system of claim 9, wherein the local network comprises a wireless and/or wired network.

11. The system of claim 1, wherein the mobile platform comprises an aeronautical or maritime platform.

12. A method of operating the system of claim 1, comprising:
a) sending said resource request from the router to the resource manager in response to traffic demand within the mobile platform; and
b) allocating, by the resource manager, said communication resources to the link interfaces.

13. A method of operating the system of claim 1, comprising:
a) detecting, by the policy master, a change in communication resource requirements within the mobile platform;
b) requesting, by the policy master to the resource manager, a corresponding variation in communication resources; and
c) varying, by the resource manager, the allocation of said communication resources to the interfaces.

14. A method of operating a mobile communication system, the system comprising:
a mobile platform having a plurality of interfaces to a respective plurality of mobile communication networks, and a router for selectively connecting one or more communications devices within the mobile platform to one or more of the interfaces, for communication over the respective mobile communication networks; and
a central core common to each of the mobile communication networks, comprising a policy master and a resource manager; the method comprising:
a) at the policy master, determining resource requirements within the mobile communication networks in accordance with one or more defined policies;

b) at the resource manager, allocating resources to the mobile communication networks in response to resource requests from the router and to resource requests from the policy master; and c) at the resource manager, controlling which of the interfaces are active on the mobile platform, such that they are connected to a respective one of the mobile communication networks, thereby controlling the respective mobile communication network's connectivity to the router.

15. The method of claim 14, further comprising:

d) sending said resource request from the router to the resource manager in response to traffic demand within the mobile platform; and e) allocating, by the resource manager, said communication resources to the link interfaces.

16. The method of claim 14, further comprising:

d) detecting, by the policy master, a change in communication resource requirements within the mobile platform e) requesting, by the policy master to the resource manager, a corresponding variation in communication resources; and f) varying, by the resource manager, the allocation of said communication resources to the interfaces.

* * * * *